(12) United States Patent
Schreiber (10) Patent No.: US 11,329,459 B2
(45) Date of Patent: May 10, 2022

(54) APPARATUS FOR REMOVING PREDETERMINED CONSTITUENT PARTS OF A CABLE ARRANGEMENT AND METHOD FOR REMOVING PREDETERMINED CONSTITUENT PARTS OF A CABLE ARRANGEMENT

(71) Applicant: LEONI KABEL GMBH, Roth (DE)

(72) Inventor: Andreas Schreiber, Schwabach (DE)

(73) Assignee: LEONI KABEL GMBH, Nuremberg (DE)

( * ) Notice: Subject to any disclaimer, the term of this patent is extended or adjusted under 35 U.S.C. 154(b) by 371 days.

(21) Appl. No.: 16/613,159

(22) PCT Filed: May 14, 2018

(86) PCT No.: PCT/EP2018/062289
§ 371 (c)(1),
(2) Date: Nov. 13, 2019

(87) PCT Pub. No.: WO2018/210704
PCT Pub. Date: Nov. 22, 2018

(65) Prior Publication Data
US 2020/0388996 A1 Dec. 10, 2020

(30) Foreign Application Priority Data
May 17, 2017 (DE) .......................... 102017208262.3

(51) Int. Cl.
*H02G 1/00* (2006.01)
*H01R 43/28* (2006.01)
*H02G 15/02* (2006.01)

(52) U.S. Cl.
CPC ............. *H02G 1/005* (2013.01); *H01R 43/28* (2013.01); *H02G 15/02* (2013.01)

(58) Field of Classification Search
CPC ......... H02G 1/005; H02G 15/02; H01R 43/28
(Continued)

(56) References Cited

U.S. PATENT DOCUMENTS 3,171,306 A  3/1965 Mirsch
3,175,289 A * 3/1965 Wilterdink ............. H02G 1/005
                                                30/180

(Continued)

FOREIGN PATENT DOCUMENTS

DE     6609219       3/1972
DE     2454437 A1    5/1976
(Continued)

*Primary Examiner* — Sean M Michalski
(74) *Attorney, Agent, or Firm* — Tarolli, Sundheim, Covell & Tummino LLP (57) ABSTRACT

The disclosure relates to an apparatus (10) for removing, at least in sections, at least one constituent part (6, 7) of a cable arrangement (1), comprising: —a positioning unit (11) having an insertion region (12), into which an end region of a cable arrangement (1) can be inserted; —an air stream supply device (64), which is designed to direct an air stream onto the cable arrangement (1); and—a processing unit (16), which can be displaced relative to the positioning unit (11); wherein a cutting region (50) is provided at at least one of the processing unit (16) and the positioning unit (11); and wherein the cutting region (50) is arranged in such a way that, in the context of the relative displacement, a predetermined constituent part (6, 7) of the cable arrangement (1) can be brought into contact with the cutting region (50) in order to separate, at least in sections, said constituent part (6, 7) from the cable arrangement (1). The disclosure further relates to a method for removing, at least in sections, at least one constituent part (6, 7) of a cable arrangement (1).

13 Claims, 4 Drawing Sheets

(58) Field of Classification Search
USPC .......... 83/24, 861, 426, 431, 947, 881, 887
See application file for complete search history.

(56) References Cited

U.S. PATENT DOCUMENTS

| | | | | |
|---|---|---|---|---|
| 3,839,790 A * | 10/1974 | Aldous | ................. | H02G 1/1292 30/90.1 |
| 3,853,156 A * | 12/1974 | Folkenroth | .......... | H02G 1/1292 140/149 |
| 4,019,409 A * | 4/1977 | McKeever | ........... | H02G 1/1265 81/9.51 |
| 4,352,305 A | 10/1982 | Rodenbeck | | |
| 4,521,946 A * | 6/1985 | Dusel | ..................... | B65G 15/14 29/33 M |
| 4,769,903 A | 9/1988 | Pierpoint | | |
| 4,860,441 A * | 8/1989 | Pierpoint | ............... | H01R 43/28 29/825 |
| 4,914,986 A * | 4/1990 | Masaki | .................. | H02G 1/127 81/9.51 |
| 5,074,169 A * | 12/1991 | Matz | .................... | H02G 1/1297 81/9.51 |
| 5,595,219 A * | 1/1997 | Deuel | .................. | H01R 9/0518 140/123 |
| 5,722,170 A * | 3/1998 | Smith | .................. | B23D 15/145 227/10 |
| 6,363,604 B1 * | 4/2002 | Sakuma | ............... | H02G 1/1256 29/564.4 |
| 9,368,259 B2 * | 6/2016 | Furuhata | ............... | H02G 1/1256 |
| 2005/0076500 A1 * | 4/2005 | Matsumura | ........... | H01R 43/28 29/828 |
| 2005/0170696 A1 * | 8/2005 | Matsuoka | .............. | H01R 43/28 439/607.41 |
| 2008/0313892 A1 * | 12/2008 | Baldauf | ................. | H01R 43/28 29/828 |
| 2013/0068524 A1 * | 3/2013 | Ito | .......................... | H01R 43/28 174/75 R |
| 2017/0310041 A1 * | 10/2017 | Nogrady | ................ | H01R 13/59 |
| 2018/0183221 A1 * | 6/2018 | Wilcox | .................. | H02K 7/116 |
| 2018/0309272 A1 * | 10/2018 | Helmick | ................ | H02G 1/1297 |
| 2019/0103737 A1 * | 4/2019 | Weaver | ................ | H02G 1/1292 |

FOREIGN PATENT DOCUMENTS

| | | |
|---|---|---|
| DE | 4238774 A1 | 5/1993 |
| EP | 0748019 | 11/1996 |
| JP | 64003607 A | 1/1989 |
| JP | 2012050169 A | 3/2012 |

\* cited by examiner

APPARATUS FOR REMOVING PREDETERMINED CONSTITUENT PARTS OF A CABLE ARRANGEMENT AND METHOD FOR REMOVING PREDETERMINED CONSTITUENT PARTS OF A CABLE ARRANGEMENT

RELATED APPLICATIONS

This application filed under 35 U.S.C § 371 is a national phase application of International Application Serial Number PCT/EP2018/062289, filed May 14, 2018, which claims the benefit of German Application No. 10 2017 208 262.3 filed May 17, 2017, the subject matter of which are incorporated herein by reference in their entirety.

TECHNICAL FIELD

The disclosure relates to an apparatus for removing, at least in a portion, at least one predetermined constituent part of a cable arrangement, and to a method for removing at least one predetermined constituent part of a cable arrangement.

BACKGROUND ART

As is known, cable arrangements can comprise a plurality of different constituent parts having different functions. The constituent parts can be formed separately from one another but combined within the meaning of a constituent part combination to form a corresponding cable arrangement, for example by extending along a common longitudinal axis and/or contacting one another. A typical constituent part is an electrical conductor arrangement which comprises one or more electrical conductors which extend along a longitudinal axis of the cable arrangement. The conductor arrangement can be enclosed by a further constituent part of the cable arrangement in the form of an (in particular electrically insulating) outer sheath, which likewise extends along the longitudinal axis. Further constituent parts can be provided for imparting to the cable arrangement specific mechanical, thermal or other properties. Thus, for example, so-called fillers or filler materials can be provided for avoiding voids within the cable arrangement and/or establishing a specific rigidity of the cable arrangement. Likewise, anti-adhesion constituent parts, anti-adhesion layers or anti-adhesion coverings can be provided for avoiding unintentional adhesion between different constituent parts of the conductor arrangement. Nonwoven materials, for example, come into consideration for this purpose (as well as for other applications).

Such cable arrangements must generally be terminated and/or further processed according to a specific intended end use. This concerns in particular the preparation of their axial end regions, in order to be able to connect them to further devices and/or to be able to attach plug units thereto. In this connection, the electrical conductor arrangement must generally be exposed so that, when considered along the longitudinal axis of the cable arrangement, it is, at least in a portion, not enclosed or enclosed only by predetermined further constituent parts of the cable arrangement.

It will be appreciated that any of the features discussed above may likewise be provided within the scope of the present disclosure.

Previous approaches for terminating such cable arrangements especially provide predominantly or exclusively manual steps for removing or exposing, in a portion, predetermined constituent parts. This is correspondingly susceptible to error, since constituent parts that are not to be removed are often inadvertently damaged.

There is therefore a need to provide an apparatus and a method for removing, at least in a portion, predetermined constituent parts of a cable arrangement, which apparatus or method is distinguished by, lower susceptibility to error.

DISCLOSURE OF THE INVENTION

To that end, the disclosure proposes an apparatus for removing, at least in a portion, at least one constituent part of a cable arrangement. The cable arrangement can be constructed in accordance with the above considerations and in particular extend along a longitudinal axis (also cable longitudinal axis hereinbelow) and/or comprise at least one electrical conductor arrangement. Further constituent parts of the cable arrangement can comprise non-electrically conducting materials for filling voids or avoiding undesirable adhesions, for example (see also nonwoven or filler materials discussed hereinbelow). In addition or alternatively, the constituent parts can comprise electrically conducting materials, for example for magnetic field shielding. The constituent parts can comprise one or more material strands, material layers and/or material portions. It will be appreciated that it is also possible to provide a plurality of constituent parts made of the same material, for example a plurality of filler material strands, each of which can in itself form an individual constituent part of the cable arrangement.

The apparatus can generally be configured to remove at least one predetermined constituent part, at least in a portion, from the cable arrangement (or from the remaining constituent parts thereof) and/or separate it from the cable arrangement. In other words, the apparatus can be configured at expose at least one selected constituent part of the cable arrangement, at least in a portion, in particular in that at least one constituent part to be removed is separated and removed, at least in a portion, by the apparatus. The exposed constituent part can be an electrical conductor arrangement of the cable arrangement. The apparatus can generally be configured to process an axial end region of the cable arrangement and to remove the constituent part to be removed in that region, at least in a portion, Consequently, the apparatus can thus be configured to expose an electrical conductor arrangement in an axial end region of the cable arrangement at least in part and/or in a portion by removing, at least in a portion, the predetermined constituent parts.

The apparatus comprises a positioning unit having an insertion region into which an end region of the cable arrangement can be inserted. The end region can be an axial end region or, in other words, an axial free end of the cable arrangement. The positioning unit can generally be configured to position the cable arrangement in a predetermined manner, in particular relative to the processing unit discussed hereinbelow. The insertion region can comprise a channel, a recess, a bore and/or a cavity into which the cable arrangement can be inserted or pushed, for example manually. The insertion region can also be formed or delimited by a plurality of separate elements and/or assembly groups which each, in a portion or together, delimit a corresponding channel, a bore or the like. The insertion region can define an insertion axis which, once insertion has taken place, can coincide substantially with the longitudinal axis of the cable arrangement. The insertion region can generally be configured to center the cable arrangement within the apparatus, in particular relative to the processing unit discussed hereinbelow. The insertion region and/or the positioning unit can be arranged substantially stationarily or immovably within the apparatus.

The positioning unit can be in one-part or in multi-part form. It can be formed independently of but also in association with the processing unit discussed hereinbelow, provided that the relative displacement therebetween can still be achieved. The insertion region can be provided within the positioning unit at least partially via a separate assembly group or unit. This can be accommodated and/or fastened in the positioning unit, in particular in such a manner that it is not displaceable within the positioning unit. The insertion region can generally be delimited or provided at least partially by a sleeve, tube or channel element which is inserted into the positioning unit.

The apparatus further comprises an air stream supply device which is configured to direct an air stream at the cable arrangement. The air stream can comprise pressurized ambient air and/or any other suitable gas or gas mixture. The orientation and/or the intensity of the air stream can be chosen according to the constituent parts to be removed. The air stream can generally be configured to urge the constituent part to be removed, at least in a portion, into a position that is not parallel with the longitudinal axis of the cable arrangement. In other words, the air stream can be configured to lift the constituent part to be removed from the cable arrangement and/or to detach it therefrom at least in a portion. This can take place in particular before or in parallel with the start of the relative displacement discussed hereinbelow, and also beyond, for example at least until the processing operation is complete. The air stream can be selectively changed and/or selectively provided. For example, the air stream can be provided according to an insertion state and/or an insertion length of the cable arrangement (for example selectively activated and/or deactivated in dependence thereon). In addition or alternatively, the air stream can be provided according to the relative displacement discussed hereinbelow (for example selectively activated and/or deactivated in dependence thereon).

The air stream supply device can comprise any suitable unit for generating the air stream and/or guiding an air stream generated by a different unit in the direction towards the cable arrangement. In addition or alternatively, the air stream supply device can be capable of being connected or can be connected to external compressed gas generating units (for example to a compressor or a compressed air reservoir). According to a variant, the air stream supply device comprises a connection region for an external compressed gas line, via which a compressed gas (for example compressed air) for providing the air stream can be introduced into the device. The air stream supply device can comprise at least one valve device. This can be selectively opened and/or closed in order selectively to direct the air stream at the cable arrangement. The valve device can be selectively openable and/or closable by a control unit of the apparatus, for example according to an insertion state and/or an insertion length of the cable arrangement.

The apparatus further comprises a processing unit which is displaceable relative to the positioning unit. The relative displacement can take place along the insertion and/or cable longitudinal axis. In particular, it can be a monoaxial relative displacement, for example along a predetermined spatial axis (for example a horizontal or vertical axis). The processing unit can be in one-part or in multi-part form and comprise, for example, a plurality of assembly groups. The processing unit can comprise a processing device which can comprise a cutting region or support region discussed hereinbelow. The processing device can be fixed within the processing unit or can also be accommodated in a displaceable manner within the processing unit. The processing device can be provided within the processing unit as a separate assembly group or unit and, for example, can be inserted into the processing unit and/or accommodated therein. The processing device can comprise a tube, channel or sleeve element which can delimit a receiving portion discussed hereinbelow.

The processing unit and the positioning unit can completely or partially delimit a common interspace. The cable arrangement can enter the interspace via the insertion region and also extend into or through the interspace. For example, the end region of the cable arrangement can be movable through the insertion region in the direction towards the processing unit and into the interspace. The cable arrangement can generally also protrude beyond the insertion region in the direction towards the processing unit and/or extend at least in a portion into the processing unit (for example into a receiving portion, discussed hereinbelow, of the processing device). According to a variant, the processing unit and the insertion region delimit, at least partially, a common interspace which is Comprised by a processing chamber as or forms the processing chamber. The processing chamber can be substantially fluidically sealed or sealable from the surroundings. In addition or alternatively, the processing chamber can be capable of being subjected at least temporarily to a predetermined air pressure, in particular to a negative pressure for extracting by suction the constituent parts removed from the cable arrangement.

Within the scope of the relative displacement, the unit from the processing unit and the positioning unit on which the cutting region discussed hereinbelow or the support region is provided can generally remain substantially stationary or can be moved to a smaller degree. The relative displacement can relate to a movement of the processing unit and/or the positioning unit as a whole. Alternatively, at least a respective part of those units can be moved, wherein that part can comprise in particular a cutting region discussed hereinbelow and/or support region. In a variant, the relative displacement is performed for the most part or substantially solely by the processing unit, while the positioning unit remains substantially stationary.

The relative displacement can be capable of being provided manually and/or by means of a drive unit (for example an electric, pneumatic or hydraulic drive unit). The removal and/or separation of the constituent parts can take place according to the relative displacement, for example in dependence on the covering of a predetermined movement distance. In particular, the removal and/or separation can take place when the initial interspace between the processing unit and the positioning unit has been at least partially bridged by the processing device.

It is further provided that a cutting region is provided on at least one of the processing unit and the positioning unit. The cutting region can be configured to perform a mechanical division or cutting of the predetermined constituent parts of the cable arrangement. This can comprise the separation or cutting of a predetermined portion of those constituent parts, wherein this portion is then removed from the cable arrangement. In other words, the cutting region can be configured to cut the constituent parts to be removed at least in a portion from the cable arrangement.

The cutting region can comprise at least one cutting edge. The cutting region can define an at least partially or completely closed form (for example can be circular or annular in shape). According to a variant, the cutting region can be inclined relative to the insertion axis or extend substantially perpendicular thereto. The cutting region can comprise at least one end face, at least one diameter step and/or at least one peripheral edge. Primarily, the cutting region can be provided in a replaceable tool unit within the apparatus, which tool unit can comprise, for example, a sleeve. The tool unit can be associated with the respective unit from the processing unit and the positioning unit and can be inserted or accommodated, for example, therein. The cutting region can comprise a conically tapering and/or radially narrowing region, for example in the form of a cutting cone.

In general, both the processing unit and the positioning unit can comprise a cutting region. They can be moved towards one another (in particular directly) within the scope of the relative displacement and, for example, clamp between them and subsequently cut through the constituent part to be removed. The cutting regions can also be moved past one another, similarly to conventional scissors.

It is further provided that the cutting region is so arranged that, within the scope of the relative displacement, a predetermined constituent part of the cable arrangement can be brought into contact with the cutting region, in order to separate that constituent part, at least in a portion, from the cable arrangement. As mentioned, this can take place only when the constituent part to be removed has been deformed and/or moved in a predetermined manner, in particular relative to the cable arrangement, by the air stream. In addition or alternatively, this can take place only when the constituent part to be removed is clamped by a clamping unit discussed hereinbelow.

In summary, it can thus be provided that the apparatus, by means of the air stream, brings the constituent part to be removed into a preferred position for interaction with the cutting region and/or the constituent part to be removed is then clamped in that position. Then, or temporally overlapping therewith, a feed motion of the cutting region can take place within the scope of the relative displacement. The cutting region can thus be brought into contact with and cut through the constituent part preferably oriented by the air stream.

Primarily, the constituent part to be removed can comprise or consist of a limp material. In other words, the constituent part to be removed can be deformable under its own weight. In particular, the material can be deformable, dividable and/or movable according to the air stream. A further development provides that the constituent part to be removed comprises at by least one of a nonwoven material or a filler material. The nonwoven material can be comprised by a jacket body or tubular body or can be in the form of such a body. The nonwoven material can lie against an inner side of an outer sheath of the cable arrangement. In general, the nonwoven material can be configured to avoid adhesions between individual constituent parts of the cable arrangement. In a variant, the nonwoven material encloses at least one constituent part of the cable arrangement along a predetermined portion of the cable longitudinal axis. For example, an electrical conductor arrangement can extend along the cable longitudinal axis through a space which is surrounded or delimited by the nonwoven material, in particular when the nonwoven material is in the form of a tube or jacket.

The filler material can be provided in the form of a material strand. The material strand can extend along an electrical conductor arrangement of the cable arrangement. The material strand can have a substantially solid or filled cross-section, that is to say, for example, it does not provide a defined cavity or channel in its interior. The filler material can generally be fibrous or porous. According to a variant, the filler material comprises cotton or a cotton mixture.

Consequently, a variant can be provided in which the apparatus removes a predetermined portion of the nonwoven material and/or filler material from the cable arrangement, in particular in order to free, in a portion, an electrical conductor arrangement of the cable arrangement.

The air stream of the air stream supply device can flow at an angle of less than 90° to and/or substantially along the longitudinal axis of the cable arrangement (for example parallel to the longitudinal axis). The angle can be an angle enclosed by the flow direction of the air stream and the cable longitudinal axis, in particular a very small cutting angle therebetween. In a variant, the air stream can have a flow direction which, at least partially, extends non-orthogonally and/or substantially parallel to the cable longitudinal axis. In addition or alternatively, the air stream can be directed at least partially contrary to an insertion direction of the cable arrangement into the insertion region. The above portions can in each case relate iii to a vector portion of the flow direction of the air stream and has an amount of greater than zero. In other words, the air stream can be so directed that it is directed at least partially and in particular frontally at the inserted axial end region of the cable arrangement, in particular at an axial end or an axial end face thereof.

The processing unit can comprise a receiving portion in which the end region of the cable arrangement can be received at least in a portion. The receiving portion can be provided at least in part in the processing device discussed hereinbefore or can be delimited thereby. Within the scope of the relative displacement, the receiving portion can be displaced along the cable arrangement, at least when a cutting process is complete and the corresponding units are moved into their starting positions again. To that end, the receiving portion can have a larger inside diameter than a constituent part of the cable arrangement that is to be exposed (for example than an electrical conductor arrangement thereof).

The receiving portion can comprise a bore, a recess or a channel into which the end region of the cable arrangement can be inserted and/or can be received. According to a variant, the receiving portion is formed at least partially by a sleeve element which, for example, can be comprised by the processing device or can form the processing device. Primarily, at least a portion of the air stream or alternatively the entire air stream can be guided through the receiving portion. The air stream can also flow along an end region of the cable arrangement inserted therein at least its predetermined operating phases. This can take place, for example, at least until an outer sheath of the cable arrangement abuts the receiving portion and at least partially limits a further outflow of the air stream from the receiving portion.

According to a further development, the receiving portion is configured to limit an insertion length of the end region of the cable arrangement. The insertion length can relate to the length with or over which the end region can be received in the receiving portion. In addition or alternatively, it can relate to the entire insertion length of the cable arrangement into the apparatus. In other words, the receiving portion can determine a maximum insertion length of the cable arrangement into the apparatus. It will be appreciated that the insertion length of the entire cable arrangement into the apparatus can also be limited thereby.

The receiving portion can be so dimensioned that only a region of the cable arrangement in which an outer sheath of the cable arrangement has already been removed can be received therein. In other words, the end region of the cable arrangement can be inserted only with a length within which the outer sheath has already been removed. According to a variant, an inside diameter of the receiving portion is equal to or smaller than a diameter of the outer sheath. Consequently, the receiving portion cannot be inserted into the receiving portion without being damaged or deformed. Primarily, the receiving portion can provide a stop region on which the outer sheath of the cable arrangement, and in particular an axial end or an axial end face thereof, abuts. An axial insertion and/or the above-mentioned insertion length of the cable arrangement can be limited thereby. Consequently, only constituent parts of the cable arrangement that extend further into the insertion device relative to the outer sheath and that are located on the inside can be inserted into the receiving portion (for example an electrical conductor arrangement thereof).

A further development provides that the cutting region is provided on one of the processing unit and the positioning unit, and on the respective other of the processing unit and the positioning unit there is provided a support region on which the cutting region can be supported within the scope of the relative displacement. The cutting region can face towards the support region and/or be opposite the support region. In particular, the cutting region and the support region can be connected by the insertion axis and/or cable longitudinal axis or, in other words, can be opposite one another along at least one of those axes.

The support region can comprise an end face or a region which is generally inclined relative to the insertion axis or extends perpendicular thereto. The support region can serve as a counter-bearing for the cutting region, so that the constituent part to be removed can be clamped between the cutting region and the support region and/or can be pressed against the support region. In other words, it can be provided within the scope of the relative displacement that the cutting region is supported on the support region. In addition or alternatively, the cutting as region can be brought into contact with the support region. However, cooperation between the cutting region and the support region for cutting through the constituent part to be removed can only take place when the predetermined constituent part has been urged into a preferred position by the air stream and/or when it has already been clamped at least in part by a separate clamping unit. In principle, however, it is also conceivable that the support region likewise provides an at least slight cutting action and/or comprises a cutting edge. Any cutting action can, however, be less than that of the cutting region.

In other words, the support region can form a type of driven or stationary stamp, while the cutting region can form or be comprised by a (for example stationary or driven) cutting zone. The clamping unit, on the other hand, can form a type of holding-down device, wherein the holding-down force can be adjusted via an optional return device. In addition or alternatively, the cutting region can be arranged on the unit from the processing unit and the positioning unit that is displaced to a greater degree within the scope of the relative displacement. Consequently, the cutting region can urge the constituent part of the cable arrangement that is to be removed against the support region that is moved to a lesser degree or that is stationary. Also conceivable, however, is the reverse case of a support region which is moved to a greater degree relative to a cutting region moved to a lesser degree. Primarily, an interaction region of the support region and the cutting region can extend substantially annularly. In other words, the cutting region and the support region can define an annular clamping and/or cutting zone, within which the constituent part to be removed can be cut through.

The cutting region and the support region can each comprise opening regions in the processing unit or the positioning unit, through which the cable arrangement can be guided. For example, a receiving portion of the processing unit can comprise an entry opening for the cable arrangement, at which the cutting region or the support region can be formed. In addition or alternatively, the insertion region can comprise an exit opening for the cable arrangement, at which the cutting region or the support region can be formed.

It should be noted that the above positioning possibilities with regard to the cutting regions can also be provided in embodiments which do not comprise an additional support region.

According to a variant, an interference fit is provided between the cutting region and the support region. In particular, an outside diameter of the cutting region can exceed an inside diameter of the support region (or vice versa). This can mean that the cutting region cannot be inserted into the support region without being damaged and/or deformed, or vice versa.

Instead, the support region can provide a stop surface which limits an axial movability relative to the cutting region. By means of the interference fit, it can be ensured that the constituent parts to be removed can extend and/or be clamped at least in a portion between the cutting region and the support region, so that they can reliably be cut through.

A further development provides that at least one of the processing unit and the positioning unit comprises a clamping unit which is configured to clamp the constituent part to be removed at least in a portion according to the relative displacement. The clamping unit can be configured to clamp a predetermined portion of the constituent part to be removed, wherein this can take place in particular before but also temporally overlapping and/or in parallel with a cutting through of the constituent part by the cutting region. The portion to be clamped can be a portion which does not come into contact with the cutting region and/or which extends further into an interspace between the processing unit and the positioning unit than the region of the constituent part to be removed that is ultimately directly cut through by the cutting region. In addition or alternatively, the portion to be clamped can be a portion which has been urged by the air stream into a predetermined position and in particular made to stand up relative to the cable longitudinal axis. A clamping region of the clamping unit can generally be arranged radially further outwards, relative to the cable longitudinal axis, than a clamping or cutting zone of the cutting region in which the constituent part to be removed is ultimately cut through.

The clamping unit can generally be provided on the unit from the processing unit and the positioning unit on which the cutting region is not provided. In principle, however, the reverse case is also conceivable. According to a variant, the clamping unit is provided on the processing unit, wherein these are together displaced by a predetermined distance relative to the insertion region. This can take place at least up to the point in time at which the clamping unit clamps, at least in a portion, the constituent part to be removed. The processing unit can then be displaced further in the direction towards the positioning unit and also relative to the clamping unit, whereby the clamping unit remains substantially stationary.

The clamping unit can define a clamping surface. The clamping surface can be configured to come directly into contact with the constituent part of the cable arrangement that is to be removed. The clamping surface can extend at least in a portion at an angle (or not parallel) to the cable longitudinal axis and/or the insertion axis. According to a variant, the clamping unit can interact with a counter-clamping region (or, in other words, a counter-clamping surface).

The counter-clamping region can be provided on the respective other of the processing unit and the positioning unit. In particular, the clamping unit, within the scope of the relative displacement, can be supported on the counter-clamping region and/or come into contact at least locally therewith. A portion to be separated of the constituent part of the cable arrangement that is to be removed can be clamped at least in part between the clamping unit (and/or the clamping surface thereof) and the counter-clamping region. The portion in question can in particular be a portion which has been lifted from the cable arrangement by the air stream or, in other words, made to stand up.

The counter-clamping region can be comprised at least partially by the positioning unit. According to a variant, the counter-clamping region can receive and/or surround the insertion region (for example in the form of a bore). This can also take place without the counter-clamping region and the insertion region directly adjoining one another, which is, however, in principle also possible. The clamping unit (and/or the clamping surface thereof) and the counter-clamping region can generally be shaped and/or oriented corresponding to one another. This can include a corresponding convex/concave form of the clamping region and the counter-clamping region and can generally be carried out in such a manner that those regions can be brought into the closest possible contact with one another. In particular, the clamping region and the counter-clamping region can be oriented or inclined in the same manner relative to the cable longitudinal axis and/or the insertion axis.

Within the scope of the relative displacement, it can be provided that the clamping unit can be brought into clamping contact with the constituent parts to be removed before the cutting region separates the constituent part to be removed from the cable arrangement. Clamping and Ls separation which start substantially simultaneously are also conceivable. Clamping contact can be understood as meaning that the clamping unit acts on the constituent part to be removed so as to effect clamping, for example as opposed to simply loosely lying against one another. The above sequence can in particular take place in such a manner that the constituent part to be removed is first clamped by means of the clamping unit and is cut through by the processing device only in a subsequent step. The clamped and finally separated portion of the constituent part to be removed can then be removed from the cable arrangement as waste material. The clamping contact can generally be maintained at least until the cutting region has separated the constituent part to be removed. Clamping can generally achieve tightening of the constituent part to be removed, in particular of a nonwoven material that is to be removed. The constituent part to be removed can thus be cut through as close as possible to the remaining constituent parts of the cable arrangement. When the constituent part to be removed is lifted (for example by means of the mentioned air stream), larger bent or deflected regions of the lifted material close to the remaining constituent parts of the cable arrangement can thus be avoided and/or better achieved. Overall, tightening within the scope of the clamping thus allows cutting through to be more precise and reliable.

In this connection it can further be provided that the clamping unit is received in a displaceable manner within the corresponding unit from the processing unit and the positioning unit. A corresponding displacement can take place at the latest from the point in time at which the clamping unit clamps the constituent part to be removed. The clamping unit as such, on the other hand, cannot be displaced further after this point in time. However, the corresponding unit from the processing unit and the positioning unit can be moved further relative to the clamping unit, whereby the clamping unit, for example, can be pushed into a receiving region in the corresponding unit.

The clamping unit can generally be so configured that further components or regions of the processing or positioning unit can be moved through or displaced along the clamping unit within the scope of the relative displacement. For example, the clamping unit can comprise a recess and/or through-bore through which a receiving portion of the processing unit or the insertion region of the positioning unit extends at least in a portion. The recess and/or through-bore can also provide a guiding action as well as slide on the component received therein.

The clamping unit can be supported on the corresponding unit from the processing unit and the positioning unit via a return device, in particular wherein the return device is resiliently deformable at the latest after the clamping contact has been established and with continuation of the relative displacement of the processing unit and the positioning unit. The support can take place at a receiving region for the clamping unit, which is formed in the corresponding unit, for example at a bottom wall of the receiving region. The return device can comprise a spring element, for example a metal spiral spring. The return device can be provided at least in a portion between the clamping unit and the processing unit. The return device can generally be so configured that, on reversal of the relative displacement of the processing unit and the positioning unit, it urges the clamping unit into an unactuated starting position again at the latest on removal of the clamping contact.

When the final cutting process is carried out, a residual spring path can still remain. In other words, the clamping unit can still not be rigidly fixed within the apparatus at that time, or can still be displaceable. Via the return device, a clamping force applied by the clamping unit can primarily be adjusted, in particular in such a manner that the clamped portion of the constituent part to be removed is tightened and tensioned in a desired manner. The clamping force can be, for example, less than 200 N or less than 100 N, for example 80 N.

According to a further development, the apparatus further comprises a sensor arrangement which is adapted to detect the insertion of the cable arrangement into the apparatus. Alternatively or in addition, the sensor arrangement can be adapted to determine a diameter of the cable arrangement present in a predetermined region of the apparatus and/or a change in diameter of the cable arrangement that occurs in that region during the insertion. Use can be made of the fact that a stripped end portion of the cable arrangement, from which corresponding further constituent parts are to be removed, generally has a smaller diameter than an adjoining portion of the cable arrangement which is still provided with an outer sheath. The sensor arrangement can thus in principle be adapted to detect what diameter and thus what portion of the cable arrangement is in the detection region (e.g. the stripped portion or the still sheathed portion), it can thus be determined whether the stripped end portion has already been inserted completely, for example when a sudden change in diameter and/or the reaching of the larger outer jacket diameter is recorded.

Primarily, the sensor arrangement can thus be adapted to acquire information about the inserted cable arrangement (e.g. the diameter thereof), wherein the information allows conclusions to be drawn about the insertion length of the cable arrangement and/or the reaching of at least one predetermined insertion length. As will be explained hereinbelow, the information can, however, also relate to changing pressure conditions, from which the reaching of a predetermined insertion length can be derived.

The insertion length can relate to a length of the portion of the cable arrangement that has been inserted inside the insertion region and/or the apparatus or, in other words, has been received therein. Primarily, the predetermined insertion length to be detected can relate to a length at which the cable arrangement leaves the insertion region and/or at which the cable arrangement enters the interspace between the processing unit and the positioning unit. Alternatively, the predetermined insertion length can relate to a length at which the cable arrangement reaches the processing unit or has been inserted therein by a predetermined degree (for example into a possible receiving portion thereof). In addition or alternatively, the predetermined insertion length can relate to a length at which an outer sheath of the cable arrangement abuts the processing unit and, where appropriate, limits the further insertion of the cable arrangement. In other words, the sensor arrangement can be configured to detect when a maximum insertion length of the cable arrangement into the apparatus has been reached.

The sensor arrangement can be configured to detect the insertion of the cable arrangement with at least a first and a second insertion length, To that end, a detection region of the sensor arrangement, which can also comprise individual detection regions for each insertion length, can be directed at corresponding regions of the apparatus which are reached by the cable arrangement after insertion with the corresponding first and/or second insertion length.

The sensor arrangement can comprise at least one sensor unit, in particular at least one sensor unit for each insertion length to be detected. The sensor unit can be based on an optical measuring principle and be in the form of, for example, a light barrier. Alternatively, the sensor unit (or the sensor arrangement in general) can detect a change in the air stream and/or detect generally changing pressure conditions within the apparatus. For example, it can be detected that the pressure conditions and/or the air stream change in dependence on an insertion length of the cable arrangement. Such a change can take place in particular when the air stream is increasingly impaired as the insertion length of the cable unit increases (for example throttled and/or backed-up, which can lead to a pressure increase). According to a variant, the air stream is guided at least partially through a receiving portion of the processing unit, wherein the cable arrangement is inserted into the receiving portion from a particular insertion length. Within the receiving portion, the air stream can then be throttled and/or built-up, which can be detected by the sensor unit (for example by detection of a corresponding pressure increase), In particular, a pressure increase can be detected at the latest when an outer sheath of the cable arrangement abuts the receiving portion and thus at least partially limits or substantially completely prevents a further outflow of the air stream from the receiving portion.

According to a variant, the sensor arrangement can comprise a first sensor unit, for example for activating the air stream supply. A second sensor unit can further be provided, for example for starting the cutting process by relative movements of the processing unit and the positioning unit. The first sensor unit can be based on an optical measuring principle and in particular can be in the form of a light barrier. It can detect the insertion of the cable arrangement with a first predetermined insertion length and/or entry for the first time into a region of the apparatus that is relevant for processing (for example entry into a processing chamber). The second sensor unit can be configured to detect an insertion of the cable arrangement with a second insertion length and/or the reaching of an end position of the cable arrangement. These states can be reached, for example, when the cable arrangement abuts a cutting region of the apparatus. The second sensor unit can be configured, according to one of the preceding variants, to detect a change in the pressure conditions and/or a change in the air stream. In other words, the second sensor unit can be in the form of a pressure sensor or, in iii other words, an air pressure sensor, which detects the reaching of the end position via a corresponding change in air pressure.

Alternatively or in addition to the above variant, it is also conceivable that the reaching of the second insertion length and/or of the end position is likewise detected by means of an optical sensor unit (for example by means of a light barrier). To that end, the detection region of the optical sensor unit can be directed at a region of the apparatus which the cable arrangement (an in particular a non-sheathed portion thereof) reaches on reaching the second insertion length or the end position. Primarily, any optical sensor unit within the scope of the present disclosure can be configured to distinguish between a sheathed and a non-sheathed portion of the cable arrangement, for example by optical distance measurements.

In summary, it can accordingly be provided that the apparatus further comprises a sensor arrangement which is adapted to detect at least one of the following:
  a diameter of the cable arrangement present in a predetermined region of the apparatus and/or a change in diameter of the cable arrangement which occurs in that region during insertion; and
  a change in the air stream and/or changing pressure conditions within the apparatus.

The apparatus can further comprise a control unit which is configured
  to change an operating state of the pressure generating device according to a detection signal of the sensor arrangement; and/or
  to control the relative displacement between the processing unit and the positioning unit according to a detection signal of the sensor arrangement.

The control unit, which can be in the form of, for example, an electronic control unit with a CPU or computing unit, can cause, for example, the selective activation or deactivation of the air stream and/or a change in the flow intensity thereof according to the detection signal. In particular, the air stream can selectively be switched on or increased when the insertion of the cable arrangement with a predetermined insertion length is detected. Likewise, the air stream can be deactivated or reduced again when it is detected that the insertion length has fallen below a predetermined insertion length again when insertion has already taken place. The predetermined insertion length can in particular relate to insertion until the cable arrangement leaves the insertion region and/or enters an interspace between the positioning unit and the processing unit.

Likewise, the relative displacement can be changed, for example selectively activated or deactivated, by the control unit according to the detection signal. In addition or alternatively, the relative displacement can be slowed down and/or accelerated. In particular, it can be provided that a relative displacement, in which a distance between the processing device and the positioning unit is reduced, is brought about by the control unit when a predetermined insertion length is reached and/or exceeded. This insertion length can be equivalent to a state in which the apparatus is in principle capable of removing from the cable arrangement the constituent parts that are to be removed. The predetermined insertion length can additionally or alternatively be reached when a maximum insertion length is reached and, optionally, further insertion of the cable arrangement is limited, for example, because a stop is reached. This can be the case, for example, when an outer sheath of the cable arrangement abuts a receiving portion of the processing unit.

A further development provides that the apparatus is configured to generate a negative pressure at the latest after the constituent parts to be removed have been separated off at least in a portion, in order to extract by suction the constituent parts which have been separated off (or the portions which have been separated off): The negative pressure can be established in the interspace between the processing unit and the positioning unit and/or in the processing chamber discussed above. By means of this negative pressure, the constituent parts can be drawn into predetermined regions of the apparatus, for example into collecting or waste regions. Alternatively, the constituent parts can be conveyed out of the apparatus as a result of the extraction by suction. The negative pressure can in turn be selectively provided, for example at the latest at the start of a relative displacement, in which the processing unit, after separation has taken place, is removed from the positioning unit again.

The disclosure relates further to a method for removing, at least in a portion, at least one constituent part of a cable arrangement, in particular by means of an apparatus according to a preceding aspect, comprising the steps:
  inserting an end region of a cable arrangement into an insertion region of a positioning unit;
  generating an air stream directed at the cable arrangement;
  moving a processing unit relative to the positioning unit in such a manner that a cutting region provided on at least one of the processing unit and the positioning unit contacts the constituent part to be removed and separates it at least in a portion from the cable arrangement.

The above steps can thereby also be carried out or begin at least in part in parallel and/or in a different order. In particular, the first two of the above steps can also be carried out or begin at least in part in parallel or in a different order. For example, the air stream can already be provided when the cable arrangement has still not been inserted into the insertion region. The second and third steps can also be carried out at least temporarily in parallel. A variant provides that the air stream is maintained at least until the separation of the constituent parts to be removed is complete.

Furthermore, it will be appreciated that the method can comprise any further of the preceding or following features or steps in order to provide all of the preceding or following effects, interactions or operating states.

The present disclosure is to be explained in greater detail by means of figures, in which, schematically:

DETAILED DESCRIPTION

In the following, specific details are explained, without being limited thereto, in order to provide a complete understanding of the present disclosure. It is clear to a person skilled in the art, however, that the present disclosure can be used in other exemplary embodiments which may differ from the details explained hereinbelow.

Figure 1:
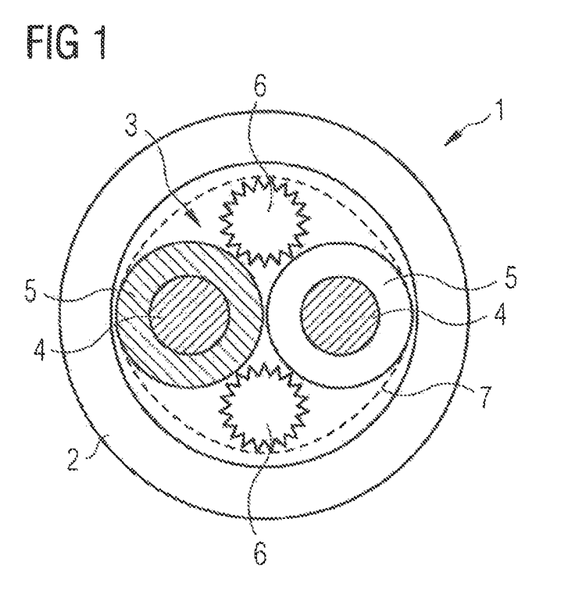
FIG. 1 is a cross-sectional view of a cable arrangement which can be processed by an apparatus and a method according to the present disclosure.

FIG. 1 shows a cable arrangement 1 which can be processed by means of an apparatus 10 described hereinbelow and a method according to the present disclosure. The cable arrangement 1 comprises a plurality of constituent parts which extend along a common longitudinal axis L (see FIG. 3a). The cross-sectional plane of the representation of FIG. 1 runs orthogonally to the longitudinal axis L. The cable arrangement 1 comprises as a first constituent part a comparatively thick-walled outer sheath 2, which consists of an electrically insulating and resilient plastics material. The outer sheath 2 is generally tubular in shape and delimits an interior space through which the further constituent parts of the cable arrangement 1 extend.

Those constituent parts are, firstly, an electrical conductor arrangement 3, which comprises two separate electrical conductors 4, each of which is surrounded by an insulating layer 5. Filler materials in the form of two filler material strands 6 are further provided. In the present case, the filler material is a cotton material or material mixture. A nonwoven jacket 7 of a nonwoven material is further indicated by a broken line, wherein the nonwoven jacket 7 surrounds the further constituent parts 3, 6 as an outer jacket or, in other words, a jacket tube. Furthermore, the nonwoven jacket 7 is directly opposite the inside wall of the outer sheath 2 and can optionally also be in contact therewith. The nonwoven material can comprise or consist of, for example, a PETP material. Both the filler material strands 6 and the nonwoven jacket 7 are generally limp and deformable under their own weight.

Figure 2:
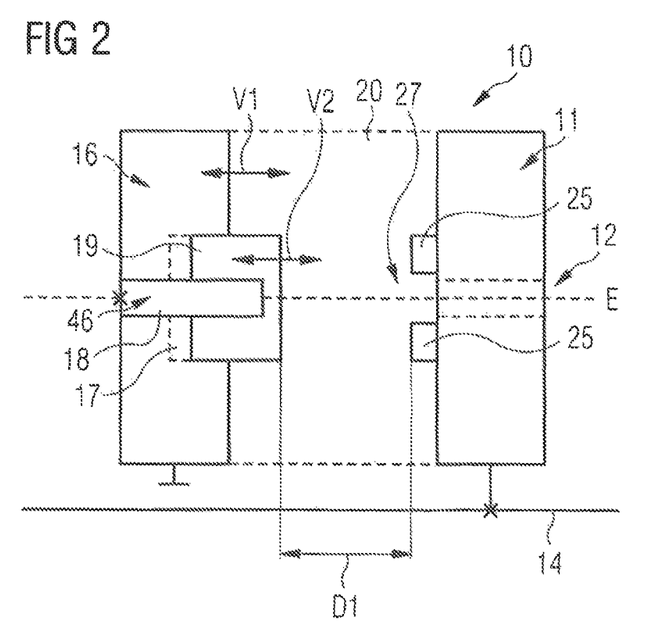
FIG. 2 is a schematic diagram of an apparatus according to a first embodiment, wherein the apparatus carries out a method according to the present disclosure.

FIG. 2 shows a schematic diagram of the apparatus 10 according to a first embodiment, wherein the apparatus 10 is generally configured to carry out a method according to the present disclosure. The apparatus 10 comprises a positioning unit 11 which comprises a channel-like insertion region 12. The positioning device 11 is fixedly arranged on an apparatus base 14 and is generally immovable. The insertion region 12 defines an insertion axis E, along which the cable arrangement 1, not shown in FIG. 2, can be inserted into the apparatus 10 and moved out of the apparatus again. After insertion into the apparatus 10, the longitudinal axis L of the cable arrangement 1 coincides with the insertion axis E.

The apparatus 10 further comprises a processing unit 16 which is displaceable relative to the machine base 14. The displacement can take place in the direction towards the positioning unit 11 and the insertion region 12, but can also be directed away from those units (see double-headed arrow V1). Furthermore, the displacement generally takes place along the insertion axis E.

Figure 3A:
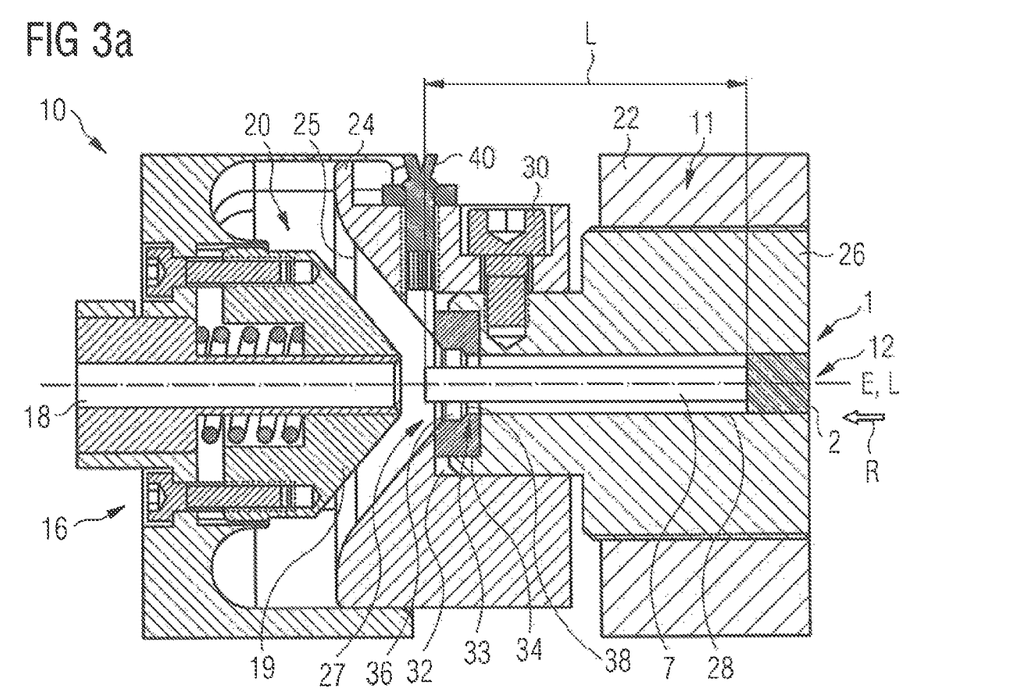
FIGS. 3a-f show a sequence of processing steps of the apparatus according to the first embodiments.
Figure 3B:
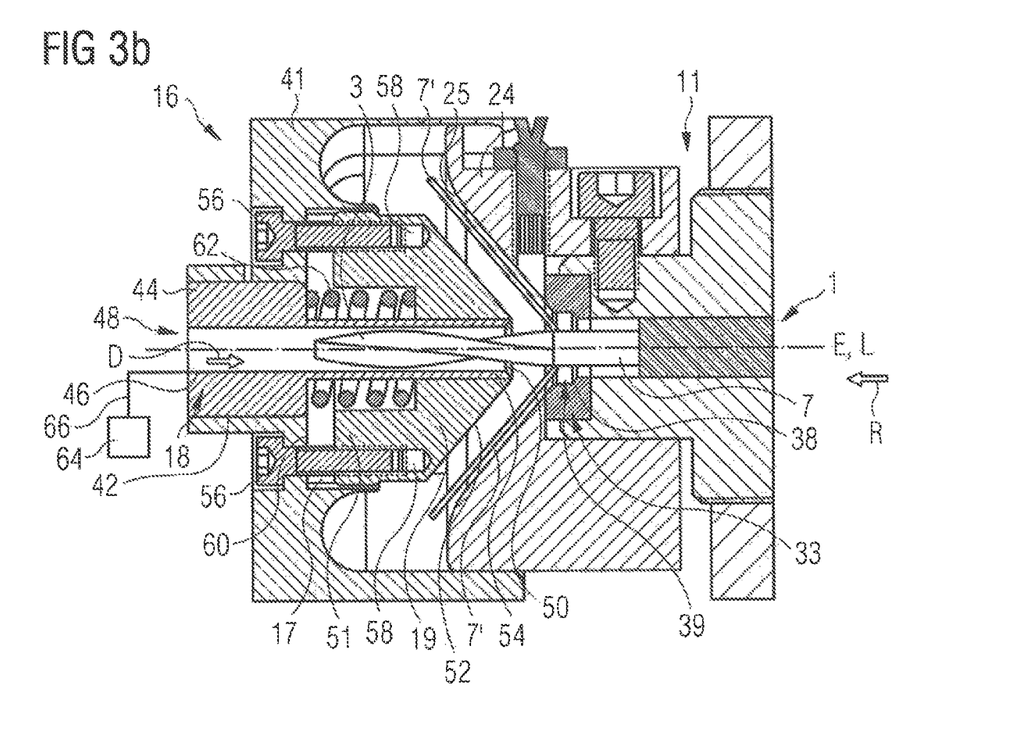

The processing unit 16 comprises a processing device 18 which is fastened within the processing unit 16 and which comprises a receiving portion 46 for the inserted end region of the cable arrangement 1 (see FIG. 3b). The cross-shaped connections in FIG. 2 each represent fixings or, in other words, fixed fastenings of two elements to one another. The processing device 18 is substantially sleeve-shaped. On its outer peripheral surface there is arranged a clamping unit 19 which is displaceable relative to the processing device 18. Displacement can again take place in both directions along the insertion axis E (see double-headed arrow V2). The clamping unit 19 is at least partially received in a receiving space 17 in the processing unit 16 and, within the scope of the relative displacement, can be displaced further into the receiving space 17 or out of the receiving space. The processing unit 16 and the positioning unit 11 further delimit an interspace in the form of a processing chamber 20.

In FIG. 2, the apparatus 10 is shown in a starting position, in which a cable arrangement 1, not shown, can be inserted but not yet processed. Processing for the separation, discussed hereinbelow, of predetermined constituent parts of the cable arrangement 1 includes a movement of the processing unit 16 and thus of the processing device 18 in the direction towards the processing unit 11 and of the insertion region 12 therein. This takes place with a reduction in a distance between those elements and a reduction in the axial dimension of the processing chamber 20.

In detail, the processing unit 16 is moved over a first predetermined distance D1 towards the positioning unit 11, until contact is established between the clamping unit 19 and a counter-clamping surface 25 of the positioning unit 11 (see FIGS. 3a-b). The processing device 18 is then displaced further over a predetermined additional distance in the direction towards the insertion region 12, while the clamping unit 19, as a result of the contact which has been established with the counter-clamping surface 25, remains substantially stationary. The processing device 18 slides relative to the clamping unit 19 or, figuratively speaking, slips through the clamping unit. The processing device 18 can then interact with an exit region 27 of the insertion region 12 which opens into the processing chamber 20, in order to carry out the processing of the cable arrangement 1 as discussed in detail hereinbelow. When this is complete, a reverse movement sequence takes place in which the processing unit 16 is moved into the starting position shown in FIG. 2 again and a new cable arrangement 1 to be processed can be inserted into the apparatus 10.

It is already clear from FIG. 2 that a cutting region 50 (see FIG. 3a) for selectively cutting iii through predetermined constituent parts of the cable arrangement 1 can in principle be provided either on the processing unit 16 or on the positioning unit 11, but also on both of these units 11, 16. In particular, a cutting region 50 can be formed in a region of the processing device 18 facing the positioning unit 11 and/or in the exit region 27 of the insertion region 12 opening into the processing chamber 20. If only one such cutting region 50 is provided, a support region 33 acting as a counter-bearing or pressure region can be provided on the corresponding other unit of the processing unit 16 and the positioning unit 11 (see FIGS. 3a-3f).

In the embodiment of FIGS. 3a-3f discussed in detail hereinbelow, the cutting region 50 is provided on the processing unit 16. The positioning unit 11, on the other hand, serves, in the manner of a counter-bearing, to hold a portion of the nonwoven jacket 7 and of the filler material strands 2 that is to be cut through against the cutting region 50, so that the cutting region 50 can be supported thereon as it cuts through the constituent parts 6, 7. FIGS. 3a-3f each show only part of the apparatus 10, the primary functional principle and structure of which is apparent from the preceding FIG. 2.

In FIG. 3a there can be seen first a part of the processing unit 11 which comprises the insertion region 12. The processing unit 11 is in multi-part form and comprises a main element 22 and a counter-clamping element 24 discussed hereinbelow. A sleeve element 26 is inserted into the main element 22, which sleeve element comprises a through-bore 28 delimiting the insertion region 12. The through-bore runs concentrically to the insertion axis E and defines the position of the axis E. An inside diameter of the through-bore 28 is so dimensioned that it is substantially equal to or slightly larger than the diameter of the outer jacket 2 of the cable arrangement 1. In the operating state shown in FIG. 3a, the cable arrangement 1 is already partially inserted into the insertion region 12. A corresponding insertion direction is designated by an arrow R in FIG. 3A. Removal of the cable arrangement 1 from the insertion region 12 correspondingly takes place in the opposite direction. The cable arrangement 1 can be displaced along the through-bore 28 but is thereby at the same time centered and positioned in a predetermined manner within the apparatus 10.

As mentioned, the positioning device 11 further comprises a counter-clamping element 24 which partially delimits the above-mentioned processing chamber 20. The counter-clamping element 24 is fastened to the sleeve element 26 by a screw 30. The sleeve element 26 and the counter-clamping element 24 delimit a common receiving space 32, in which a tool unit 34 or, in other words, a matrix unit 34 is received. The tool unit 34 comprises the support region 33 of the apparatus 10, by means of which cutting through of selected constituent parts of the cable arrangement 1 is achieved.

The tool unit 34 contains a central through-bore 36 which extends concentrically around the insertion axis E and which comprises a plurality of diameter steps. The through-bore 36 continues the insertion region 12 in a portion and faints an exit region 27 or, in other words, an outlet opening from the insertion region 12 into the processing chamber 20. In the through-bore 36, a transition region to the diameter step having the smallest diameter (or a peripheral edge region of that smallest diameter step) defines a substantially conical contact surface 38. The contact surface 38 represents the element within the support region 33 that is active in terms of support, at which the constituent parts 6, 7 of the cable arrangement 1 that are to be removed are ultimately cut through (see explanations hereinbelow).

A sensor unit 40 is further arranged in the counter-clamping element 24, which sensor unit functions according to the principle of a light barrier. A detection region of the sensor unit 40 is directed at the exit region 27 of the cable arrangement 1 from the insertion region 12 or from the positioning unit 11. In other words, the detection region of the sensor unit 40 is directed at an entry region of the cable arrangement 1 into the processing chamber 20.

In the left-hand half of FIG. 3a there is further shown a portion of the processing unit 16 which is described hereinbelow with additional reference to FIG. 3b. The processing unit 16 is likewise in multi-part form and comprises a main element 41. The main element comprises a recess 42, which in the example shown runs concentrically around the insertion axis E. The processing device 18 is inserted into the recess 42 and fastened therein in a non-displaceable manner. In the example shown, the processing device 18 likewise comprises a sleeve element 44 which comprises a through-bore 48 which extends concentrically around and also along the insertion axis E. The through-bore 48 forms a receiving portion 46 of the processing device 18. As shown in FIG. 3b, an axial end region or a free end of the cable arrangement 1 can be pushed through the processing chamber 20 and into the receiving portion 46.

An axial end face of the sleeve element 44 facing towards the support region 33 and the insertion region 12 forms a cutting region 50. The cutting region comprises a cutting edge, for which the contact surface 38 acts as a type of counter-bearing. In the case shown, the cutting region 50 is adapted, within the scope of the relative displacement, to press a portion of the constituent parts 6, 7 to be removed against the contact surface 38. More precisely, a corresponding portion of the constituent parts 6, 7 to be removed can be clamped between the cutting region 50 and the contact surface 38 and then cut through, whereby the cutting region 50 can be supported on the support region 33, To that end, an interference fit is provided between the support region 33 and the cutting edge of the cutting region 50. This is achieved in that an outside diameter of the cutting region 50 is slightly larger than an inside diameter of the contact surface 38 and thus cannot be introduced into the insertion region 12 without being damaged.

In summary, it will be seen that the support region 33 and the cutting region 50 define an annular clamping and/or cutting zone 39 which extends along the inner periphery of the through-bore 36 and which, in accordance with the conical shape of the contact surface 38, likewise extends conically. The cutting zone 39 further has a diameter which only slightly exceeds the inside diameter of the through-bore 28 of the insertion region 12. In addition or alternatively, it can radially overlap with the through-bore 28 and/or, starting from the through-bore, extend further radially outwards, Finally, the cutting zone 39 is positioned comparatively close to the insertion axis E.

There will further be seen in FIGS. 3a,b the clamping unit 19 already mentioned in connection with FIG. 2. The clamping unit is in the form of a component which is separate from the processing device 18 and in particular from the sleeve element 44 thereof. In the case shown, the clamping unit 19 comprises a substantially cylindrical main element 51 with a cone-shaped and/or conical clamping surface 52. The clamping unit 19 further comprises a through-bore 54 extending through the main element 51. The through-bore lies against an outer peripheral surface of the sleeve element 44, so that the main element 51 is displaceably guided along the sleeve element 44. A further guiding action is provided by at least two guide bolts 56 which are positioned radially further outwards relative to the through-bore 54. The guide bolts are screwed into the main element 41 and each extend into a blind bore 58 in the main element 51 of the clamping unit 19.

s There can further be seen the receiving space 17, likewise already mentioned in connection with FIG. 2, in which the clamping unit 19 is displaceably received. Between a bottom surface 60 of the receiving space 17 and a rear side, remote from the positioning unit 11, of the clamping unit 19 there is arranged a return device in the form of a metal spiral spring 62. Via the spiral spring 62, the clamping element 19 is supported on the main element 41 of the processing unit 16. In the starting position, shown in FIGS. 3a,b, of the processing unit 16 and of the clamping unit 19, the spiral spring 62 is in a relaxed and non-deformed state. As explained hereinbelow, however, it is compressed within the scope of the relative displacement of the processing unit 16 and the positioning unit 11 and, on returning to the starting position with resilient relaxation, is able to move the clamping unit 19 back into its original position.

Finally, an air stream supply device 64 is shown schematically in FIG. 3b. The air stream supply device in the present case comprises a compressor with which ambient air is compressed to form compressed air. The compressed air is guided via an air stream line 66, likewise indicated only schematically, of the air stream supply device 64 into the through-bore of the receiving portion 46. The air stream supply device 64 is able to initiate a corresponding air stream only selectively, for example by selectively opening a valve device, not shown separately.

As is indicated by an arrow D, the direction of the air flow is generally guided along the insertion axis E but contrary to the insertion direction R. The air flow thus first passes through the receiving portion 46 and then frontally strikes an end face or a free axial end of the inserted end region of the cable arrangement 1.

A processing sequence of the cable arrangement 1 by the apparatus 10 will be described hereinbelow with additional reference to the further FIGS. 3c-f. Returning first to FIG. 3a, it will be seen that, in the inserted end region of the cable arrangement 1, the outer sheath 2 in a defined end portion has already been removed. This end portion has the axial length L indicated in FIG. 3a. The removal of the outer sheath 2 can take place in a known manner by manual or mechanically assisted stripping. It will be seen that the correspondingly stripped end portion has a smaller diameter than the outer sheath 2. Furthermore, the nonwoven jacket 7 shown in tubular form, which forms an outer jacket of the stripped end portion, has thereby also been removed. The outer sheath 2 is further so dimensioned that it is further able to fluidically seal the processing chamber 20 at least partially or substantially completely. This can be effected in particular in that substantially no or only very little air is able to escape via the through-bore 28. Thus, by means of the frontal air stream discussed hereinbelow, the constituent parts to be removed can be oriented in a desired manner without being blown out of the processing chamber 20 and/or into the through-bore 28.

In the stripped state shown, the cable arrangement 1 is pushed into an insertion opening, not shown, of the insertion region 12 and moved in the direction towards the processing chamber 20. This can likewise be carried out manually or with mechanical assistance. After a predetermined insertion length, which corresponds to the axial distance of the insertion opening, not shown, and the exit region 27 from the insertion region 12, the free axial end of the cable arrangement 1 enters the detection region of the sensor unit 40. More specifically, that end of the cable arrangement 1 breaks the light barrier of the sensor unit 40. The insertion of the cable arrangement 1 with the mentioned predetermined insertion length can thereby be detected and signaled to a control unit, not shown, of the apparatus 10.

The control unit then delivers an activation signal to the air stream supply device 64, whereupon the air stream supply device introduces an air stream according to arrow D into the receiving portion 46 of the processing unit 16. The air stream frontally strikes the exposed nonwoven jacket 7 of the cable arrangement 1. As shown in FIG. 3b, the insertion of the cable arrangement 1 is then continued, wherein the cable arrangement is pushed further in the direction towards the processing unit 16. A flow speed and/or a pressure of the air stream is so dimensioned that it is capable of separating the nonwoven jacket 7 and lifting it from the remaining constituent parts of the cable arrangement 1 and urging it into a non-parallel position relative to the cable longitudinal axis L.

This is shown in FIG. 3*b* by two schematically indicated nonwoven jacket halves 7', which extend at an angle of about 45° to the cable longitudinal axis L and are initially held in that position by the air stream. In particular, it can be provided that the nonwoven jacket halves 7' lifted by the air stream are pressed against a counter-clamping surface 25, facing the clamping unit 19, of the counter-clamping element 24. The counter-clamping surface 25 forms a counter-clamping region of the apparatus 10, The filler material strands 6 can also be lifted by the air stream from the remaining constituent parts of the cable arrangement 1 and urged into an angled position relative to the cable longitudinal axis L, but this is not shown separately. Based on FIG. 3*b*, in each case one of the filler material strands 6 from FIG. 1 can be associated with one of the nonwoven jacket halves 7' and pressed by the air stream against the counter-clamping surface 25.

It will thus be seen from FIG. 3*b* that the constituent parts of the cable arrangement 1 that are to be removed in a portion, in the form of the nonwoven jacket 7 and the filler material strands 6, are separated and/or lifted in succession by the air stream in the manner described above. This begins immediately when a corresponding portion of the stripped end portion of cable arrangement 1 enters the processing chamber 20 (see the still closed nonwoven jacket 7 in the right-hand half of FIG. 3*b*). It will further be seen that only the conductor arrangement 3 thus remains as a constituent part extending along the cable longitudinal axis L, The conductor arrangement 3 comprises the above-mentioned electrical conductors 4, which in the case shown are twisted together and form a twisted pair. Thus, overall, only the electrical conductor arrangement 3 enters the receiving portion 46 of the processing unit 16. As will be explained hereinbelow, the electrical conductor arrangement 3 thus forms a region of the cable arrangement 1 ultimately exposed by the apparatus 10, which region has a length L according to FIG. 3*a*.

Figure 3C:
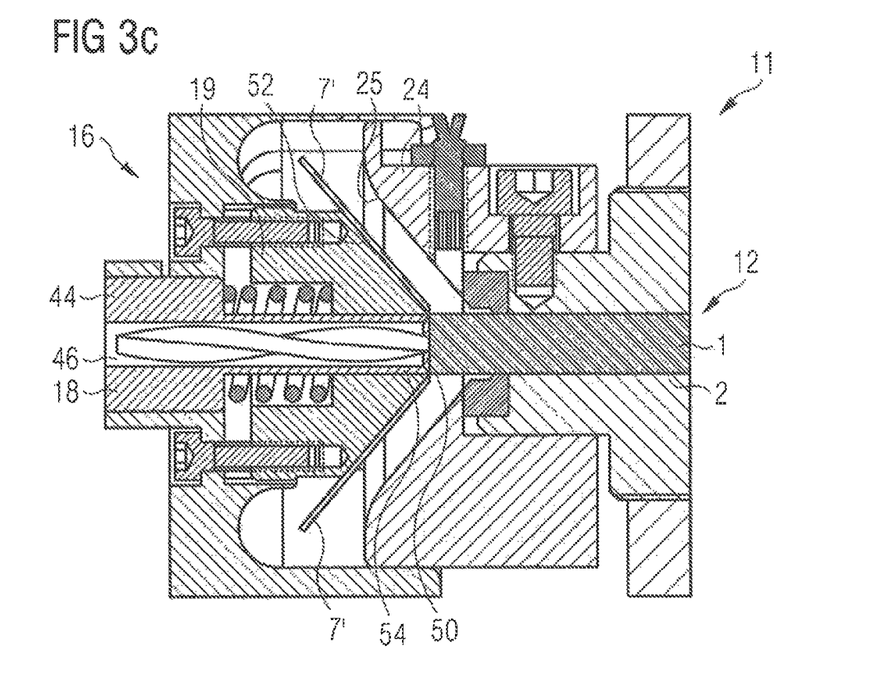

FIG. 3*c* shows a state in which the stripped end region of the cable arrangement 1 has been pushed over its entire length L from FIG. 3*a* from the insertion region 12 into the process chamber 20 and into the receiving portion 46. The original nonwoven jacket 7 has thereby been separated along the entire length L by the air stream in the manner described hereinbefore and, together with the filler material strands 6, has been lifted from the conductor arrangement 3. In the state shown, the cable arrangement 1 has reached its maximum insertion length. The reason for this is that the remaining region of the cable arrangement 1 that is still enclosed by the outer sheath 2 has now reached the processing device 18. Specifically, the outer sheath 2 comes into contact with the cutting region 50, which has a smaller inside diameter compared to the outside diameter of the outer sheath 2. The outer sheath 2 thus cannot be pushed into the receiving portion 46 but abuts the cutting region 50. A maximum insertion length of the cable arrangement 1 into the apparatus 10 is thus calculated from the axial distance between the cutting region 50 and the insertion opening, not shown, into the insertion region 12, when the processing unit 16 is in its unactuated starting position.

That this maximum insertion length has been reached can again be detected by means of a sensor. This is achieved by means of a sensor unit (not shown separately) integrated into the air stream supply device 64, which sensor unit measures the pressure conditions within the air stream line 66. This sensor unit is capable of detecting a pressure change which is established in the air stream line 66 and in particular an overpressure which is established. This occurs at the latest when the outer sheath lies against the cutting region 50, whereby the air stream is partially or substantially completely prevented from being able to further emerge from the receiving portion 46 and enter the processing chamber 20. Thus, when the sensor unit of the air stream supply device 64 has detected that the maximum insertion length has been reached, a drive unit, not shown separately, of the apparatus 10 is activated by the control unit in order to move the processing unit 16 in the direction towards the positioning unit 11. Furthermore, the air stream supply device 64 is made to discontinue the air stream by the control unit. The nonwoven jacket halves 7', which are again shown schematically, are thus no longer urged against the counter-clamping surface 25 and can therefore, as shown, first lie against the clamping surface 52.

Figure 3D:
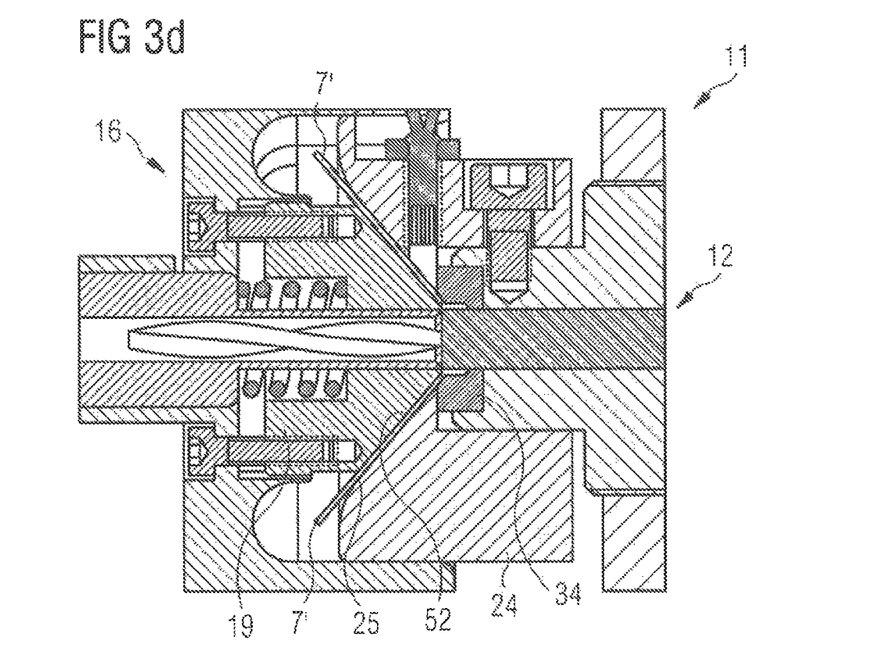

FIG. 3*d* shows a state in which the processing unit 16 has already been moved over a first predetermined distance D1 (see FIG. 2) in the direction towards the positioning device 11. More specifically, a state has been reached in which the clamping unit 19 is supported on the counter-clamping element 24. The nonwoven jacket halves 7' and the analogously oriented filler material strands 6 are then clamped between the clamping surface 52 and the counter-clamping surface 25. It is clear from FIG. 3*d* that these surfaces 25, 52 are formed corresponding to one another, in order to achieve Contact that is as close as possible. In the case shown, the clamping surface 52 is conical and also generally convex in form, while the counter-clamping surface 25 has a corresponding concave form. Furthermore, it will be seen that the cable arrangement 1 has likewise been urged backwards by the predetermined distance D1 within the insertion region 12 (see positions of the outer jacket 2 in FIGS. 3*c-d*).

Figure 3E:
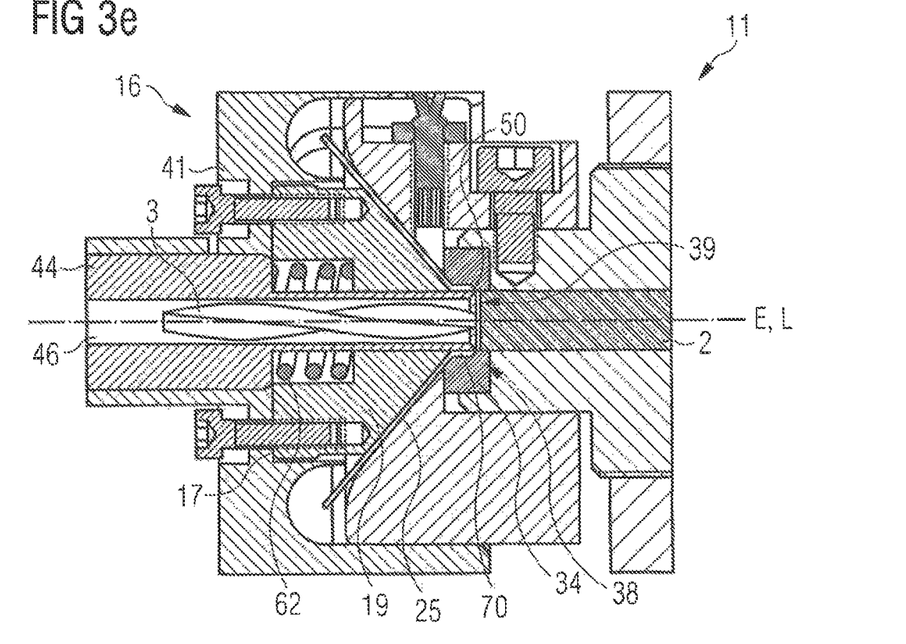

FIG. 3*e* shows a state in which the processing unit 16 has been moved beyond the state of FIG. 3*d* further in the direction towards the positioning unit 11. However, since the clamping unit 19 is already in contact with the counter-clamping element 24, it cannot follow this displacement further. Instead, the clamping unit 19 remains in its position from FIG. 3*d* and is displaced relative to the further constituent parts of the processing unit 16. Specifically, the main element 41 of the processing unit 16 moves further in the direction towards the positioning unit 11, so that the receiving space 17 is pushed, as it were, increasingly over the stationary clamping unit 19. This is accompanied by a corresponding compression of the return spring 62 and in the present case requires a force of at least 80 N. Furthermore, the sleeve element 44 of the processing device 18 slides through the through-bore 54 of the clamping unit 19 in the direction towards the tool unit 34.

The portion of the constituent parts 6, 7 to be removed that is clamped by the clamping unit 19 can be tightened in a desired manner depending on the clamping force applied within the scope of the relative displacement. In other words, the clamped portion can remain substantially stationary. This can also have the result that the material of the constituent parts to be removed is pulled from the cutting region 50 in the direction towards the contact surface 38, with local thinning and/or the onset of tearing. This concerns in particular a material portion 70 which has been urged into the tool unit 34, as shown in FIG. 3*e*. In other words, in the embodiment shown, the clamping unit 19 can act as a type of holding-down device, wherein a suitable holding-down force can be established in particular via the return forces of the spiral spring 62.

The constituent parts 6, 7 to be removed are cut through completely at the latest when the cutting region 50 presses a portion of the constituent parts 6, 7 to be removed against the contact surface 38. This is a portion of the constituent parts 6, 7 to be removed that is close to the inserted end of the outer sheath 2. More specifically, within the cutting zone 39, the material of the constituent parts 6, 7 to be removed is clamped between the support region 33 and the cutting region 50 and then cut through completely. It will be seen that this portion of the constituent parts 6, 7 to be removed that is ultimately cut through is located radially further inwards than the portion that is clamped by the clamping unit 19.

Figure 3F:
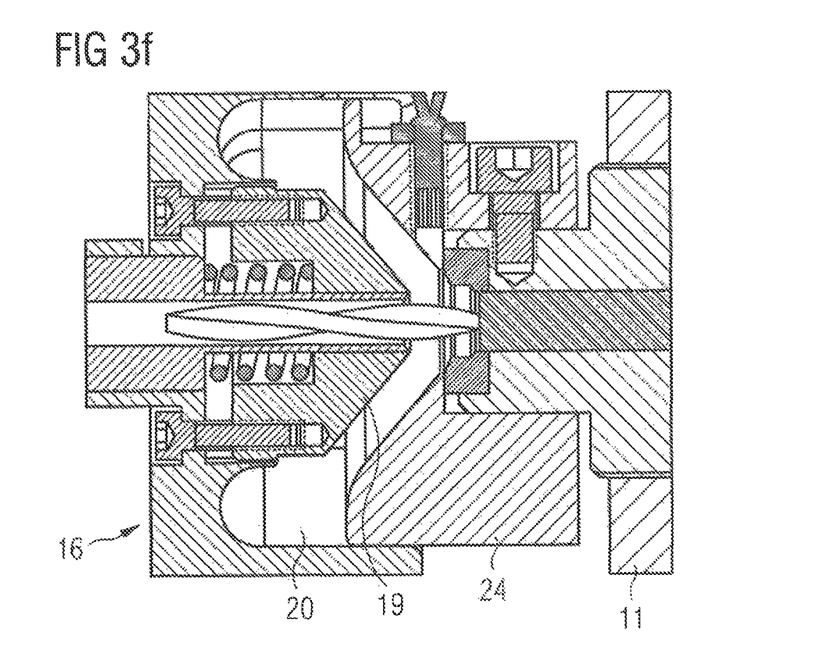

Once separation has taken place, a reverse movement sequence is carried out, in which the processing unit 16 moves in the opposite direction and is lifted from the positioning unit 11. The cable arrangement 1 thereby remains in the position of FIG. 3e, in particular because the receiving portion 46 has an inside diameter which is larger than an outside diameter of the conductor arrangement 3. The receiving portion can thus be displaced without contact along the conductor arrangement 3. Furthermore, the clamping unit 19, after lifting from the counter-clamping element 24, is urged back into its starting position by resilient relaxation of the spiral spring 62. The clamped portions of the nonwoven jacket 7 and the filler material strands 6 which have been separated from the cable arrangement 1 then fall from the counter-s surface 25. The embodiment shown optionally provides that a negative pressure is generated in the processing chamber 20 at the latest when a backwards movement of the processing unit 16 starts. The separated portions can thereby be extracted from the apparatus 10 by suction. A position of the apparatus 10 that is ultimately reached after a complete processing operation is shown in FIG. 3f.

As a result, the nonwoven material and the filler material (or the nonwoven jacket 7 and the filler material strands 6) are thus separated and removed from the inserted end region of the cable arrangement 1 over the length L from FIG. 3a. Consequently, the conductor arrangement 3 is completely exposed over a corresponding length L, so that the cable arrangement 1 can be connected to further apparatuses in subsequent processing operations.

An advantage of the apparatus 10 according to the embodiment shown is in particular that the nonwoven and filler material, which hitherto could be removed only with difficulty, is first urged by the air stream into a suitable position for the cutting process. It can then be clamped and held in that position. Thus, reliable and precise separation is ultimately made possible, for which a simple monoaxial feed motion of the processing unit 16 and the positioning unit 11 is sufficient.

Although the present disclosure has been described in connection with the embodiments, it is obvious to the person skilled in the art that the present disclosure can be changed and modified in different ways without departing from the scope of protection of the present disclosure established in the enclosed claims.

The invention claimed is:

1. An apparatus for removing, at least in a portion, at least one constituent part of a cable arrangement, comprising:
   a positioning unit having an insertion region into which an end region of a cable arrangement can be inserted;
   an air stream supply device, which is configured to direct an air stream at the cable arrangement; and
   a processing unit, which is displaceable relative to the positioning unit;
   wherein a cutting region is provided on at least one of the processing unit and the positioning unit; and
   wherein the cutting region is so arranged that, within the scope of the relative displacement, a predetermined constituent part of the cable arrangement can be brought into contact with the cutting region in order to separate that constituent part at least in a portion from the cable arrangement, wherein at least one of the processing unit and the positioning unit comprises a clamping unit which is configured to clamp the constituent part to be removed at least in a portion according to the relative displacement, wherein the respective other of the processing unit and the positioning unit comprises a counter-clamping region, wherein, within the scope of the relative displacement, the constituent parts to be removed can be clamped between the clamping unit and the counter-clamping region before the cutting region separates the constituent part to be removed from the cable arrangement.

2. The apparatus as claimed in claim 1,
   wherein the constituent parts to be removed comprise at least one of a nonwoven material or a filler material.

3. The apparatus as claimed in claim 1,
   wherein the air stream of the air stream supply device flows at an angle of less than 90° relative to and/or substantially along a longitudinal axis of the cable arrangement, and in particular wherein the air stream is directed at least partially contrary to an insertion direction of the cable arrangement into the insertion region.

4. The apparatus as claimed in claim 1, wherein the processing unit comprises a receiving portion in which the end region of the cable arrangement can be received at least in a portion.

5. The apparatus as claimed in claim 4,
   wherein the receiving portion is configured to limit an insertion length of the end region of the cable arrangement.

6. The apparatus as claimed in claim 1, wherein the cutting region is provided on one of the processing unit and the positioning unit, and on the respective other of the processing unit and the positioning unit there is provided a support region on which the cutting region can be supported within the scope of the relative displacement.

7. The apparatus as claimed in claim 6,
   wherein an interference fit is provided between the cutting region and the support region.

8. The apparatus as claimed in claim 1, wherein the clamping unit is displaceably received within the corresponding unit from the processing unit and the positioning unit.

9. The apparatus as claimed in claim 8,
   wherein the clamping unit is supported via a return device on the corresponding unit from the processing unit and the positioning unit, in particular wherein the return device is resiliently deformable at the latest after the clamping contact has been established and with continuation of the relative displacement of the processing unit and the positioning unit.

10. The apparatus as claimed in claim 1, wherein the apparatus further comprises a sensor arrangement which is adapted to detect at least one of the following:
    a diameter of the cable arrangement present in a predetermined region of the apparatus and/or a change in diameter of the cable arrangement which occurs in that region during the insertion; and
    a change in the air stream and/or changing pressure conditions within the apparatus.

11. The apparatus as claimed in claim 10, wherein the apparatus further comprises a control unit which is configured
- to change an operating state of the air stream supply device according to a detection signal of the sensor arrangement; and/or
- to control the relative displacement between the processing unit and the positioning unit according to a detection signal of the sensor arrangement.

12. The apparatus as claimed in claim 1, wherein the apparatus is configured to generate a negative pressure for extracting the separated constituent parts by suction, at the latest after the constituent parts to be removed have been separated at least in a portion.

13. A method for removing, at least in a portion, at least one constituent part of a cable arrangement, comprising the steps:
- inserting an end region of a cable arrangement into an insertion region of a positioning unit;
- generating an air stream directed at the cable arrangement;
- moving a processing unit relative to the positioning unit in such a manner that a cutting region provided on at least one of the processing unit and the positioning unit contacts the constituent part to be removed and separates it from the cable arrangement,
- wherein the method is carried out by means of an apparatus as claimed in claim 1.

* * * * *